Dec. 15, 1959 J. R. PADRICK 2,916,925
PULLEY
Filed Sept. 6, 1956

INVENTOR.
JOHN R. PADRICK
BY
ATTORNEY

United States Patent Office 2,916,925
Patented Dec. 15, 1959

2,916,925
PULLEY

John R. Padrick, Anniston, Ala.

Application September 6, 1956, Serial No. 608,371

1 Claim. (Cl. 74—230.5)

This invention relates to pulleys for flexible power transmitting belts or the like, and is particularly concerned with a pulley adapted for use with a conventional V-belt.

While the art of pulleys in general is ancient and highly developed, and while pulleys specifically designed for use with V-belts, the cross-section of which may be generally defined as an isosceles trapezoid, certain problems exist with respect to the frictional relation of the belt with the pulley in order to insure faithful response between belt and pulley. Further problems arise with respect to the maintenance of a clear belt path for the pulley particularly where such belts and pulleys are used in agricultural implements where dirt and foreign matter may readily accumulate on the belt or in the pulley groove to preclude the effective and efficient operation. It is also highly desirable to provide a pulley of light weight and one specially designed to meet the demands of economic manufacture.

It is therefore among the objects of the present invention to provide a novel and improved pulley particularly designed for use with V-belts and which provides for a maximum of frictional engagement between pulley and belt to insure the faithful responsive movement of the pulley and the belt.

Another object of the present invention is to provide a V-belt pulley the structure of which provides for the undulation of the belt as it passes around the pulley in order to insure minimum slippage between the elements.

It is also an object of the present invention to provide a pulley which is of substantially open construction as distinct from the flanged type or grooved pulleys in which material may be lodged between the flanges and in the groove to inhibit the efficient and effective operation thereof.

Another object of the invention is to provide a pulley of the character defined utilizing radial, spaced and interdigitated belt engaging fingers between which dirt and foreign matter may be easily and/or automatically dislodged during rotation of the pulley to preclude the buildup of such material and the consequential deterioration of efficiency.

The invention also has an object to provide a pulley of the general character referred to incorporating means by which a belt passing thereover is caused to be deformed in an undulating manner in order to insure a positive grip between belt and pulley.

A further object of the invention is to provide a device of the character described in which the pulley hub is so constructed and designed as to avoid a plane surface upon which dirt and foreign matter may lodge to the detriment of the operational characteristics thereof.

Numerous other objects, features and advantages of the present invention will be apparent from consideration of the following specification taken in conjunction with the accompanying drawings, in which.

Figure 1:
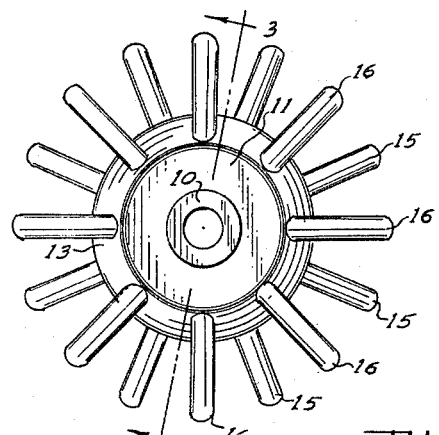
Fig. 1 is a side elevation of one form of the present invention.
Figure 2:
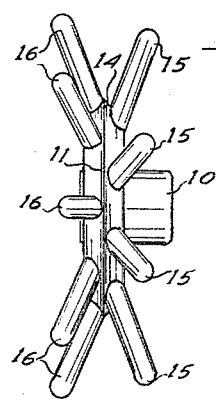
Fig. 2 is an edge elevation of that form of the invention shown in Fig. 1.
Figure 3:
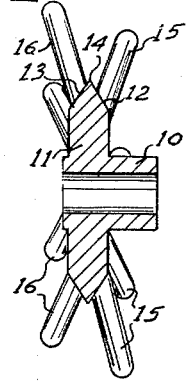
Fig. 3 is a cross-sectional view taken on the line 3—3 of Fig. 1.

While the present inventive concept may be carried out with various structural embodiments involving choice of design, dimensions, materials and configurations, that form of the invention here presented by way of illustration may be generally characterized as comprising a pulley hub the exterior face of which includes a flange presenting a pair of equal and opposite converging beveled surfaces presenting a central annular apex. From the beveled surfaces there extend oppositely divergent and interdigitatedly related belt engaging fingers defining therebetween a path of travel for a V-belt which is of isosceles trapezoid cross-section. By virtue of the alternating spacing of the fingers extending from one of the beveled faces with respect to the fingers of the opposite beveled face by which the interdigitation of the fingers is carried out and by virtue of the fact that a spacing between the fingers of each beveled surface is less than the width of the belt to be accommodated, the belt will be flexed in the direction of its length in convolute manner so as to materially enhance the grip between belt and pulley and diminish possible slippage therebetween. Furthermore, the sharp apex between the beveled sides prevents the accumulation of dirt or foreign matter and together with the open sides defined by the spaced fingers insure light weight and economy of manufacture without sacrifice of durability.

Referring now more particularly to the drawings, that form of the invention here presented comprises a central cylindrical pulley hub 10 of conventional form from which extends a radial body 11 the peripheral edge of which is formed with opposed and equally angular bevels 12 and 13 terminating in a central apex 14 which defines the central transverse plane of the pulley. Extending outwardly from the bevel 12 and preferably at an axis substantially normal to the surface thereof there are provided a plurality of belt gripping fingers 15 here shown as circular in cross-section and equally spaced. Similarly from the beveled surface 13 like fingers 16 are extended on an axis substantially normal to the plane of the bevel 13. It will, of course, be understood that the angular relation of the fingers 15 and 16 will be determined by the angular characteristics of the side walls of the V-belt here indicated at 17 with which the pulley is to be associated. Preferably the divergent angle of the fingers is in conformity with the divergent angle of the opposite side of the belt.

Figure 4:
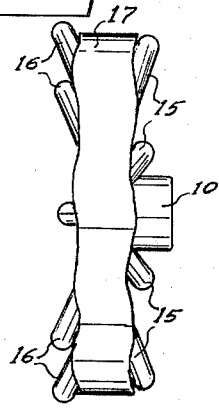
Fig. 4 is an edge view illustrating the pulley with a belt applied thereto.
Figure 5:
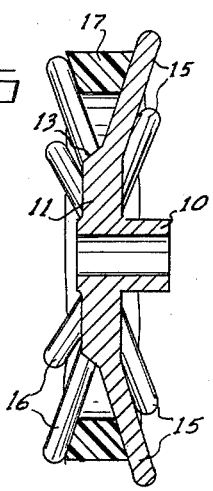
Fig. 5 is a cross-sectional view similar to Fig. 3 showing the pulley with the belt engaged therein.

An important feature of the present invention is the fact that while the fingers 15 extending from the bevel 12 are of equal number to the fingers 16 of the bevel 13, the fingers are displaced from side to side, the fingers 15 being disposed centrally intermediate the fingers 16 in interdigitated manner. Furthermore the invention contemplates that the fingers be in circular planes more closely adjacent the central transverse plane of the pulley as defined by the apex 14 than one-half of the width of the belt 17 with which the pulley is to be used. Hence, as the pulley is engaged by the fingers 15 it will be displaced transversely from the transverse plane of the hub body 11. Thus the fingers 16 will tend to displace the belt in a direction opposite to the attempted displacement thereof by the fingers 15. As a result it will be noted, as more clearly depicted in Fig. 4, that in its traversal over any segment of the pulley, the belt 17 will be undulated transversely of the central transverse plane of the pulley and the normal straight flight of the belt when not in contact with the pulley. It will be seen that in the tendency of the fingers to apply such undulation to the belt a maximum security of the belt with the fingers is secured in order to enhance the frictional engagement and preclude the danger of slippage of the belt with respect to the pulley.

An important feature of the present construction is the fact that by the converging tapers of the bevels 12 and 13 meeting at the apex 14 no flat surface is provided upon which dirt or foreign matter may lodge. Thus if such foreign matter is deposited between the fingers and though temporarily engaged therebetween by pressure from belt 17 such foreign matter will be released to fall free of the pulley as the belt parts from between the fingers.

The invention, of course, is not limited to the manner of manufacture or to materials employed. It will, however, be noted that the present construction lends itself to economic manufacture by casting methods. The material used may be such metal as is durable and rugged and particularly designed to withstand the elements so as to render the device highly adaptable for use in agricultural implements. The invention is not limited either to the angular relation of either of the sets of fingers or to the number thereof, and if desired plural fingers may be disposed intermediate spaced opposing fingers of the other side of the pulley. It will be understood that such changes and modifications may be resorted to without departure from the spirit or scope of the invention as defined in the appended claim.

I claim:

A V-belt pulley including a hub, a radially extending smooth-walled flange body on said hub terminating in a pair of inclined peripheral bevels which intersect to form an apex at substantially the central transverse plane of the flange, and a pair of interdigitated sets of radiating cylindrical finger means disposed on axes normal to the surface of said bevels and extending upwardly and outwardly therefrom and spaced apart and inclined for convolutely receiving and frictionally gripping a V-belt therebetween.

References Cited in the file of this patent

UNITED STATES PATENTS

| | | |
|---|---|---|
| D. 175,929 | Boggs | Nov. 1, 1955 |
| 1,668,778 | Menningen | May 8, 1928 |
| 2,633,751 | Browning | Apr. 7, 1953 |

FOREIGN PATENTS

| | | |
|---|---|---|
| 1,886 | Great Britain | of 1873 |
| 478 | Great Britain | of 1883 |
| 320,743 | France | Aug. 23, 1902 |
| 181,065 | Germany | Feb. 1, 1907 |
| 341,444 | Germany | Oct. 1, 1921 |
| 421,325 | Italy | May 20, 1947 |